Aug. 12, 1969  R. W. LORENZ  3,460,530
ORTHOPTIC EXERCISING DEVICE
Filed Feb. 18, 1965  2 Sheets-Sheet 1
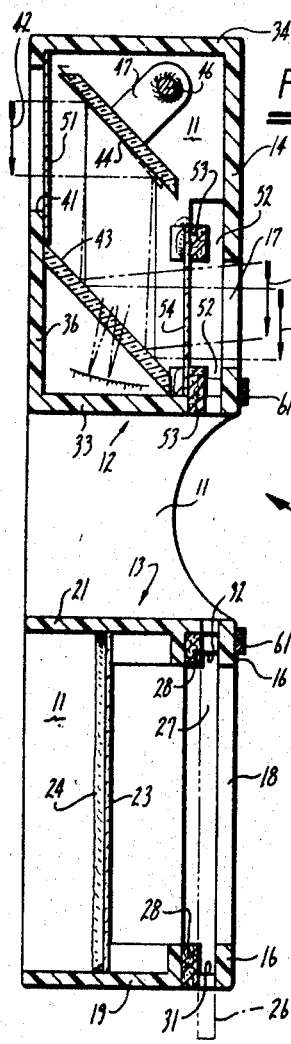
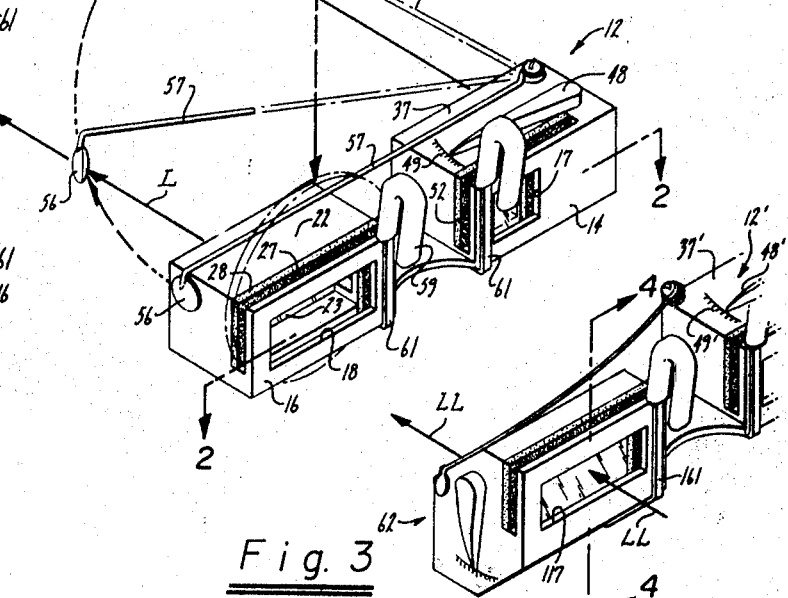
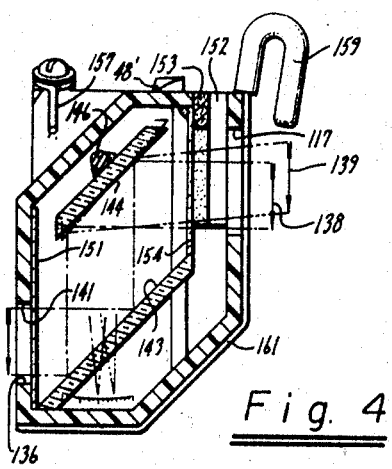
Fig. 1
Fig. 2
Fig. 3
Fig. 4
Fig. 5
INVENTOR.
Ralf W. Lorenz
BY
Attorneys Aug. 12, 1969   R. W. LORENZ   3,460,530
ORTHOPTIC EXERCISING DEVICE
Filed Feb. 18, 1965   2 Sheets-Sheet 2
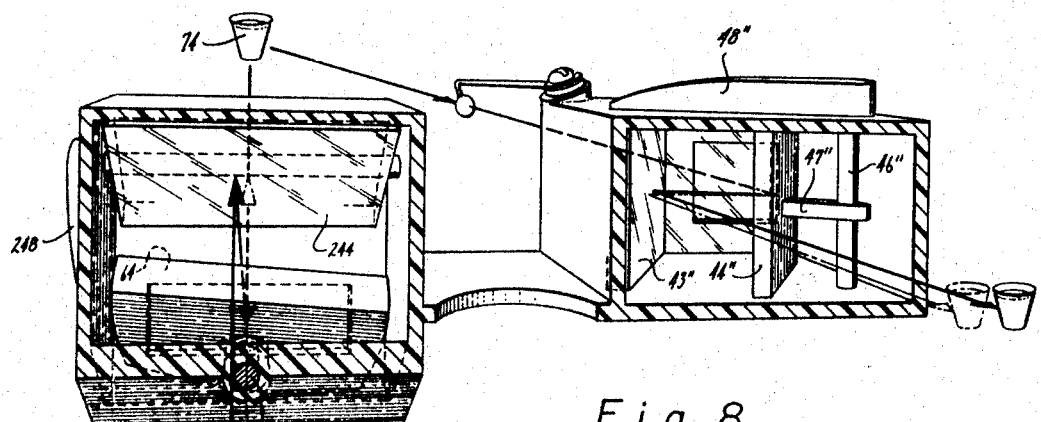
Fig. 8
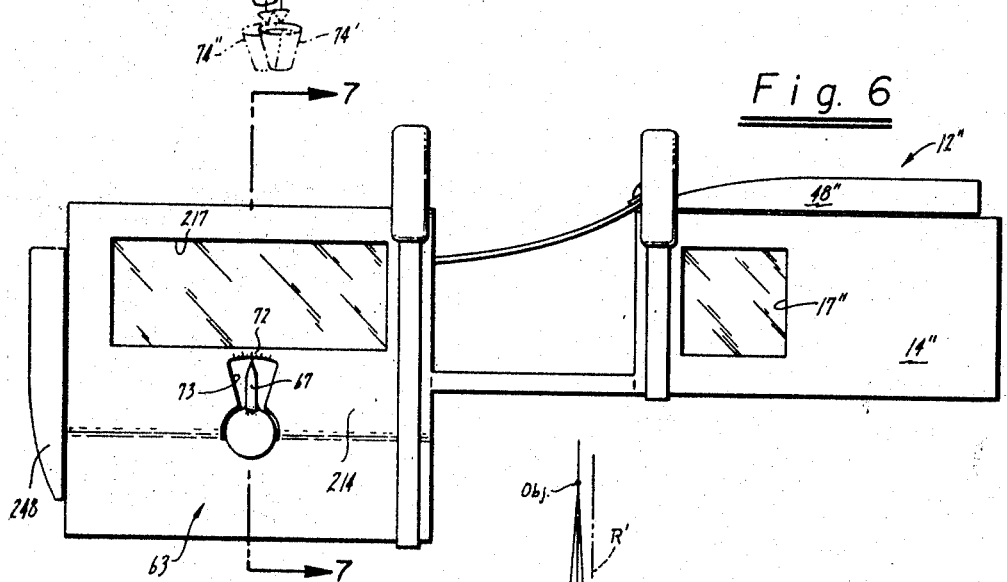
Fig. 6
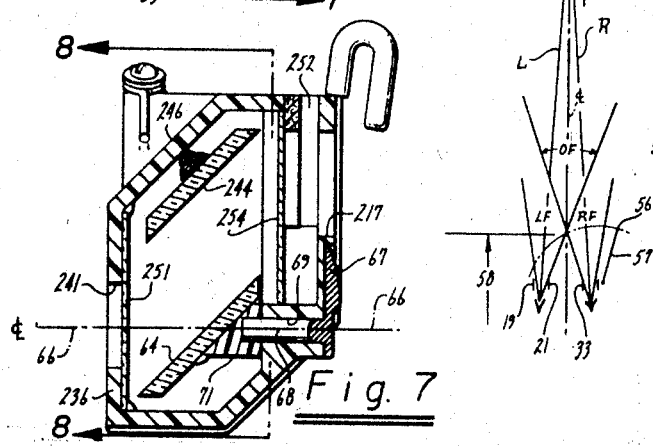
Fig. 7
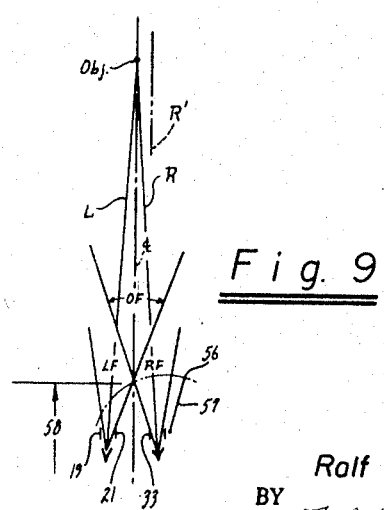
Fig. 9
INVENTOR.
Ralf W. Lorenz
BY 
Attorneys

United States Patent Office 3,460,530
Patented Aug. 12, 1969

3,460,530
ORTHOPTIC EXERCISING DEVICE
Ralf W. Lorenz, 1396 Summit Road,
Berkeley, Calif. 94708
Filed Feb. 18, 1965, Ser. No. 433,666
Int. Cl. A61b 5/00
U.S. Cl. 128—76.5       11 Claims

ABSTRACT OF THE DISCLOSURE

A device adapted to be worn by attachment to spectacles includes a viewing passage for each eye. One eye looks directly through a viewing passage while the line of sight for the other eye can be suitably varied so as to effect fusion. A check mark can be swingably positioned in front of one or the other of the two viewing passages. Each visual path is arranged whereby a polarized lens can be interposed and variously obscure the images transmitted along such paths. Embodiments for correcting various conditions of strabismus entailing horizontal deviation of the two respective visual lines, vertical deviation, and cyclo or rotated deviation of the visual lines or combinations thereof are provided.

SPECIFICATION

This invention pertains to ocular diagnostic and therapeutic devices. More particularly it relates to such a device useful in building comfortable single binocular vision, or effecting fusion, for cases of binocular imbalances and means for detecting and treating strabismus, i.e., abnormal deviation between the visual lines of sight for a person's two eyes.

A person having a normal condition of balance of his ocular muscles in each of his two eyes, wherein their visual lines meet at the object of regard or fixation point toward which they are directed, and which remains so directed when one or the other eye is covered, is referred to herein as having orthophoria. Accordingly, orthophoric vision pertains to normal single binocular vision wherein the phoria (orientation of the visual axes) is normal such that comfortable fusion of the respective monocular images of a single target or object of regard will exist.

In certain people binocular imbalances exist wherein the respective monocular visual lines will not meet at the object of regard toward which they are directed. This condition wherein the visual axes cannot be directed to the same object, because of incoordination of the muscles of the eyeballs has been referred to as strabismus or heterophoria. Varying degrees of such conditions make it difficult if not impossible to effect fusion of ocular images of the same object. Fusion entails neuro and motor mechanical action in providing alignment of such images.

Various conditions of strabismus entail horizontal deviation of the two respective visual lines, vertical deviation of the visual lines, and cyclo or rotated deviation of the visual lines or combinations thereof for which correction may be desired.

By way of further background in certain cases of strabismus, as for example cross-eye or wall-eye conditions, it has been known and will be understood that sometimes the neurological facilities of the defective eye act to suppres their functioning whereby the person will be seeing substantially only with the remaining good eye. This condition of suppression of the neurological facilities is sometimes referred to as suspenopsia.

As disclosed herein a device is provided which is particularly useful in detecting suspenopsia, for imposing an anti-suppression stimulant to the suppressed eye, and for building a comfortable fusion of the respective monocular images by means of orthoptic exercises in which the ocular muscles are exercised by means of forced movements of the eyes in order to correct various deviations therein.

According to the device disclosed herein, environmental, as distinguished from artificial, objects of regard can be employed. By permitting the use of environmental objective targets a higher degree of motivational stimulus can exist for the use of the device. Thus, for example, where the object target constitutes a television screen, long periods of ocular evercising can be pursued.

In general it is an object of the invention to provide an improved ocular exercising and diagnostic device.

It is another object of the invention to provide an improved ocular device for breaking down neutrological suppression which may exist for various reasons such, for example, as caused by strabismums.

Another object of the invention is to provide an improved ocular device for developing fusional facilities so as to establish a single comfortable binocular vision.

These and other objects of the invention will become more readily apparent from the following detailed description of preferred embodiments of the invention when taken in conjunction with the drawings in which:

FIGURE 1 is an isometric view according to one embodiment of the invention;

FIGURE 2 is a sectional top plan view taken through the device shown in FIGURE 1 in a plane along line 2—2;

FIGURE 3 is an isometric view showing a portion of a further embodiment according to the invention;

FIGURE 4 is an elevation section through FIGURE 3 taken in a plane along line 4—4;

FIGURE 5 is a side elevation view of the embodiment of FIGURE 3 shown in use;

FIGURE 6 is an elevation view of another embodiment according to the invention shown from the rear;

FIGURE 7 is an elevation section view taken along the line 7—7 of FIGURE 6;

FIGURE 8 is a perspective view of the embodiment of FIGURE 6 taken along the line 8—8 in FIGURE 7; and FIGURE 9 is a diagram provided for purposes of explanation of operation of the invention with particular illustrative reference to the embodiment shown in FIGURE 1.

In various of the foregoing views visual lines have been indicated in accordance with the following convention. A phantom line entailing a single dot between successive dashes refers to a visual line of sight without correction or adjustment. Phantom lines respectively entailing a double dot, triple dot, and quadruple dot between successive dashes refer to lines of sight entailing introduction of a horizontal, vertical, and cyclo-rotational adjustment, respectively.

An orthoptic exercising device, as provided herein, generally comprises means forming a frame or base from which various of the other elements are supported. The device is adapted to be carried across the face of the wearer by hanging it upon spectacle frames worn by the patient. The region in front of each eye of the wearer is masked and through the mask a window is provided for viewing. The windows are adapted to accommodate a wide range of interpupillary distances so that the device can be used by a number of people. For each eye there is provided a viewing passage formed to define a restricted visual field for its associated eye so that the visual fields will partially overlap commencing at a predetermined distance in front of the viewer.

The overlap is such that at least some environmental objects of regard will lie common to each field of vision and thereby provide, as to a given one of these targets, a line of sight extending from the target to each eye respectively. Means have been incorporated for adjustably changing the direction of one of the two visual lines of sight with respect to the other so as to induce a displacement of the ocular image of the given target. This displacement serves to vary the amount of fusional effort required of the person wearing the device in order to provide merging or fusion of the respective monocular images of the single object of regard.

In general, in order to permit an environment object to be employed in conducting orthoptic exercises whereby the same target is used simultaneously with both eyes, means are employed which serve to develop and maintain binocular vision, as for example to breakdown suppression and, thereafter monitor binocular vision.

Accordingly, in general, a marker or check mark is selectively movable to be positioned into one or the other of the fields so as to intrude upon the vision of one or the other of the eyes, as by casting a blurred or shadow image upon the retina. Taking, for example, a case of suppression, in order to impose an anti-suppression stimulus upon the suppressed eye, means are provided for gradually rendering the monocular image of that target common to each eye less discernable to the good eye. Preferably, the marker is carried at a distance in front of the wearer whereby it cannot be disposed simultaneously into both visual fields.

With reference to FIGURE 1 there is shown an ocular device 10 of the kind described and which is suitable for introducing horizontal deviation between visual lines of sight, R and L. The line designations R and L pertain to a line of sight from the object to the eye for the right and left eye of a person using the device. This convention will be retained throughout the following disclosure.

The device 10 as shown in FIGURE 1 is built upon a flat frame or base 11 which extends across the length of the bottom of the construction. Right-hand and left-hand ocular viewing units 12, 13 respectively are supported upon base 11. Upwardly extending masking panels 14, 16 are supported along the rear edge of base 11 so as to be disposed closely spaced in front of each eye of the viewer. Each panel 14, 16 includes a window 17, 18 respectively. The rear edge of base 11 is formed to include a rather wide recess to accommodate the viewer's nose and, as is apparent, window 18 is laterally elongated whereby by aligning window 17 with the right eye of the viewer, a wide range of interpupillary distances can be accommodated.

Each viewing unit 12, 13 includes means forming a viewing passage aligned with the respective windows 17, 18. Each such viewing passage defines a restricted visual field for its associated eye whereby the visual fields partially overlap commencing at a predetermined distance in front of the wearer.

Thus, unit 13 includes upstanding sides 19, 21 which are joined across the top by a top panel 22 and across the bottom by base 11. The forward end of the viewing passage for line L is substantially unobstructed whereby, as shown in FIGURE 9, the field of view LF is defined to the left eye of the viewer by the forward edges of panels 19, 21, 22 and of base 11.

Unit 13 includes means for gradually rendering the monocular image of a target less discernable for the viewer's left eye whereby an anti-suppression stimulus can be imposed upon the other eye.

Thus, as shown particularly in FIGURE 2, a pane 23 or lens of a light-polarizing material extends transversely of the left viewing passage to lie in the path of light passing along line L. Pane 23 can be secured as by glue 24 distributed along the edge thereof.

A second light polarizing lens, such as the removable lens 26, fits into a slot 27 formed between the rear edge of panels 19, 21, 22 and the forward side of masking panels 16. A felt pad 28 is secured around the forward margin of slot 27 to retain the lens 26.

By rotating lens 26 in slot 27 the degree of cross-polarization existing between pane 23 and lens 26 will determine the amount of light reaching the eye of the observer. For ease in establishing a predetermined known condition of light transmission through the cross-polarized lens 23, 26, a notch or detent 29, provided in lens 26, is formed to cooperate with the left edge 31 or right edge 32 of rearwardly extending portions of unit 13. The bottom of slot 27 is open except for these support portions so as to accommodate the bottom of lens 26.

Viewing unit 12 is formed by a pair of vertical side panels 33, 34 respectively, the rear masking panel 14, a front panel 36, a top closure panel 37, and base 11 at the bottom.

Unit 12 includes means for applying horizontal deviation to line of sight, R, whereby the normal image 38 of a target will be laterally displaced in window 17, and accordingly, in the eye of the viewer. The displaced image is represented in FIGURE 2 by an arrow 39.

Front panel 36 includes a window 41 disposed to pass an image, represented by the arrow 42. A front silvered, fixed mirror 43 is mounted within unit 12 at substantially a forty-five degree angle to windows 17, 41. An adjustable mirror 44, also front silvered, is supported to lie in a plane spaced from and substantially parallel to, mirror 43. The image 42 of the object enters window 41, is reflected from mirror 44 onto mirror 43, and then passes to the right eye of the viewer through window 17.

Means for pivoting the plane of mirror 44 with respect to the plane of mirror 43, are included so as to introduce a selected degree of horizontal angular displacement to images being viewed through unit 12. The generally vertical plane of mirror 44 pivots about a vertical axis, preferably spaced therefrom, as defined by the pivot pin 46. Pin 46 is suitably secured, as by welding, to a pivot arm 47 which carries mirror 44. Pivot pin 46 is preferably spaced from the plane of mirror 44 whereby larger, and therefore less sensitive, angular displacements of pivot pin 46 can be employed to rotate the plane of mirror 44.

Pivot pin 46 is rotated by a mirror control lever 48, disposed on the top of unit 12, the end of lever 48 serving as a pointer. Indicia means in the form of a scale 49 serves to provide a measure of the horizontal deviation which has been introduced into line of sight R.

Pivot pin 46 preferably extends through both base 11 and top panel 37, making a relatively snug fit where it passes through these two walls. In this manner, mirror control lever 48 will entail a relatively stiff movement sufficient to retain its selected setting.

Accordingly, scale 49 includes a neutral or orthophoric position. The orthophoric position on scale 49, when in registry with the pointer end of lever 48, will correspond to that angle of separation between the respective monocular images (of a single objective target) passing to a viewer's eyes along visual lines R and L for a viewer having normal fusional facilities. In short, with the mirror control lever 48 set at this position designated, for example O, the effect is as of an orthophoric pair of eyes. By suitably spacing pivot pin 46 from the plane of mirror 44 the mirror control lever 48 is capable of more clearly indicating horizontal deviation on scale 49 from the orthophoric position and can be indicated by subdividing scale 49 in prism diopters.

A transparent pane 51 closes window 41, and, as in the case of unit 13, unit 12 further includes means for rendering the transmitted image less discernable to the eye for purposes of imposing an anti-suppression stimulus upon the left eye.

Accordingly, lens 26 can also fit into a slot 52, likewise provided with felt pads 53 as in unit 13. A light-polarizing pane or lens 54, therefore, cooperates with lens 26 when the latter is positioned into slot 52 and thereby permits the passage of a controlled degree of light.

Both slots 27 and 52 are sufficiently open whereby auxiliary lenses can be retained for use along with the polarizing lens 26. For example, certain lenses for training accommodative facilities, such as the near focusing ability of the eye, can be utilized along with the suppression and deviation training. Accordingly, this training lens can place an object at a position other than infinity in order to train accommodative responses.

Finally, as respects the embodiment shown in FIGURES 1 and 2 and diagrammatically illustrated in FIGURE 9, means, now to be described, have been provided for purposes of building continuous binocular viewing of the object target being watched, as for example, by detecting suspenopsia or suppression in either the right or left eye of the viewer.

A marker or "check mark" 56 is selectively positionable from a retracted position to each of two advanced positions so as to enter one or the other of the fields of view and thereby cast a shadow image into one or the other eye of the observer. The presence of the shadow image in the eye of the viewer, if noticed, will indicate monocular viewing through that eye.

As is known, the viewer may be unaware as to which eye is receiving the shadow image. Therefore, the pivot arm 57 extends for a length sufficient to carry marker 56 far enough away from the eyes of the viewer to cast its shadow image into the viewer's eyes but yet to stay substantially within that predetermined distance 58 (FIGURE 9) beyond which the fields of view LF and RF will overlap, as the overlapping field, OF.

In short, pivot arm 57 is long enough to cast a blurred image upon the retina of either eye which, when perceived by the viewer, will indicate that an eye is in use. Additionally, however, pivot arm 57 is short enough when taken with the point of overlap 58 of the two restricted visual fields, LF and RF, so as to insure that only the right or left eye can view the check mark 56 thereby identifying which eye is perceiving the mark.

As will be noted further below, the cross polarized lenses of one or the other units 12, 13 aid the use of marker 56 in building continuous binocular viewing. When marker 56 is not in use it is snugly positioned conveniently out of the way along the left side of unit 13. Accordingly, it will be noted that the length of pivot arm 57 substantially corresponds to the intertemplar distance of the device.

Finally, as will be apparent, U-shaped clips 59 are formed by bending the ends of a pair of thin flat metal support pieces 61. By covering the bent ends with a soft rubber or plastic material, clips 59 form means for readily releasable attachment to spectacles of the viewer which will thereby support the ocular device in position for viewing. The thin flat metal support pieces 61 are bent to extend forwardly in supporting engagement beneath base 11 and are suitably secured thereto.

Operation of the ocular device 10, for example, as when employed with a wearer having a severe squint condition, such as cross-eye, can entail some or all of the following procedures.

As is known in the cross-eye condition, the crossed eye frequently will involve a suppressed neurological facility. Thus, the viewer actually is employing monocular vision through the useable eye only. Accordingly, with this assumed condition and assuming that it is the right eye of the viewer which has crossed and the left eye is usable, lens 26 is positioned in front of window 18 of unit 13. Lens 26 is rotated to a position transmitting a minimum of light to the left eye thereby imposing an anti-suppression stimulus or demand on the right eye tending to break down suppression in the right eye. At the same time mirror control lever 48 is positioned as nearly as possible to a position whereby fusion of the respective monocular images ought to occur. Then, by positioning check mark 56 into line of sight R, the initial stages of breakdown of suppression in the right eye can be detected by the presence of a shadow image cast upon the right eye.

As a patient views a single common environmental object through both eyes, when he commences use of his crossed eye, the acknowledged presence of marker 56 will indicate the initial stages of breakdown of his suppression. Subsequently, by varying the position of mirror control lever 48 to positions slightly off the position wherein fusion comfortably occurs the ocular faculties can be exercised by forcing them to exert additional effort in establishing fusion of the respective monocular images. As the patient's capabilities improve, the monocular image along visual line L can be gradually rendered more visible and check mark sampling continued.

As a diagnostic device, lens 26 can be removed and check mark 56 positioned selectively in front of the left or right eye to determine whether or not the patient employs monocular or binocular vision normally. This of course would be done with the mirror control lever 48 disposed at its orthophoric indicia mark on scale 49.

From the foregoing it will be readily apparent that the ocular device 10 is readily usable with the more interesting environmental objects, such as television programs and the like whereby the motivational stimulus for its use in following an ocular training program has been significantly enhanced.

Another embodiment of the invention is shown in FIGURES 3, 4 and 5 wherein vertical deviation training can be effected. The left-hand viewing unit 62 serves to raise and lower the line of sight LL in a vertical plane. The right hand viewing unit in the embodiment shown in FIGURE 3 corresponds to the right hand unit 12 of the embodiment of FIGURE 1, and accordingly the elements thereof are designated by their corresponding numbers but with the addition of a prime mark (') associated with each.

In addition, the following numbering convention has been employed for purposes of describing the left hand viewing unit 62. Initially it will be observed that there are certain similarities between the simple means for vertically varying the line of sight LL and the two mirror means for horizontally varying the line of sight R, previously described. Accordingly, as a numbering convention, a third significant digit has been associated with similar elements in the present embodiment whereby the following limited description will render its construction immediately obvious in the light of the foregoing.

Thus, front panel 136 includes an objective window 141 which serves to define the field of view for unit 62. An image entering window 141 is reflected from the front silvered surface of the fixed mirror 143. Mirror 143 is held rigidly in place at a forty-fixe degree angle to the vertical panel 136. A second front silvered mirror 144 is pivotally supported for movement about a pivot pin 146 in accordance with the actuating movements of a mirror control lever 148 whereby an image reflected therefrom into the eye of the observer can be selectively positioned. Image 138, therefore, represents the orthophoria position of the images whereas image 139 has been vertically displaced.

The orthophoria condition of mirror 144 is registered on a scale 149 carried externally of the device and marked on the left panel 119. A polarizing pane or lens 154 cooperates with lens 26 when the latter is disposed into slot 152.

Check mark 156 is carried on the end of a support arm 157 which is mounted whereby it can be moved selectively into and out of both the left visual line of sight LL and right line of sight RR. In this regard, support arm 157 has been bent somewhat downwardly whereby it will compensate for the differential in the levels of windows 141 and 41.

From the foregoing description it will be at once apparent that the utilization of a pair of front silvered mirrors in each of units 62 and 12, wherein one mirror is fixed at a forty-five degree angle to the line of sight from the target to the window 141, and the other is movable about either a horizontal or vertical axis, 146, 46 respectively, extreme simplicity and considerable reliability have been imparted to the device.

In another embodiment according to the invention, and as now to be described, there is provided means for training cyclo deviation.

As is known the eyes are capable of adjusting to rotational orientations of the head. For example, if a person tilts his head, the image of the environment as viewed, does not similarly tilt. This is explainable by the fact that there is a cyclo movement of the eyes within their sockets. However, certain persons suffer from cyclo deviation, requiring treatment.

As shown in FIGURES 6, 7 and 8 another embodiment of the invention is provided wherein cyclo deviation can be trained.

Certain similarities in construction obtain between the embodiment shown in FIGURES 6 through 8 and that of FIGURES 3 through 5. Accordingly, certain of the elements of the right hand unit (for training horizontal deviation) have been numbered as in the embodiments shown in FIGURES 1 and 3, but with an associated double prime mark (").

Further, in numbering the elements in the left hand viewing unit 63 of the embodiment of FIGURE 6 a third significant digit, one order greater than the third significant digit of the numbers applied to the embodiment of FIGURES 3 through 5, has been used. Thus, the front panel 136 in FIGURE 4 is shown in FIGURE 7 as 236. Similarly, the objective window 141 in panel 136 of FIGURE 4 corresponds substantially to the objective window 241 in panel 236 of FIGURE 7.

Means, as now to be described, have been provided in the viewing unit 63 for purposes of training cyclo-deviation conditions of the observer.

A pair of mirrors 244, 64 are arranged to be adjustably positionable into spaced parallel planes whereby an image entering objective window 241 will be transmitted without deviation to the eye of the observer. Mirror 244 is controlled by lever arm 248 whereby vertical deviation can be trained, as in the embodiment previously described.

Mirror 64 is supported at a forty-five degree angle to horizontal when panel 236 is oriented in a vertical plane. Mirror 64 is mounted for pivoting movement about a horizontal axis 66 which is parallel and preferably coincident with the line of sight through the left viewing unit 63. In this manner, after mirrors 64, 244 have been adjusted to compensate for any vertical deviation of the observer's left eye, cyclo deviation can be trained by rotation of mirror 64 about axis 66.

Means for rotating mirror 64 about axis 66 include the pointer 67 formed with a stem 68 which extends forwardly in a snugly fitting drilled hole 69 formed through the rear of unit 63. The forward end of stem 68 protrudes sufficiently into the hollow region within unit 63 to receive a mounting boss 71 thereon. Boss 71 supports mirror 64 from the back side thereof whereby rotation of pointer 67 serves to rotate mirror 64 about axis 66. The degree of rotation of pointer 67 is indicated by the scale 72 scribed on the rear of masking panel 214. Pointer 67 is recessed into a well 73 which serves to protect pointer 67 against being bumped during use of the apparatus.

Operation of the embodiment shown in FIGURES 6 through 8 proceeds as now to be described.

Assuming that mirror control lever arms 48", 248, and 67 have respectively been set to their orthoptic positions as registered upon their respective scales, and further assuming that the observer is watching an object schematically represented as the drinking cup 74, then the line of sight RRR can be shifted to compensate for horizontal deviation by movement of mirror control arm 48". Thus, the image of object 74 will thereafter appear to the right or left of its normal orthophoric position (shown in full lines in FIGURE 8) so as to be located at a corrected position, such as the position shown in phantom lines in FIGURE 8.

Vertical deviation, for example, in the left eye, is then compensated by movement of lever arm 248 whereby mirror 244 applies a vertical shift to the left hand line of sight LLL so as to shift the image of object 74 downwardly to a position indicated by the image 74'.

After correcting for vertical deviation in the left eye cyclo deviation can be compensated or trained by means of rotational movement of pointer 67 whereby object 74 is viewed as image 74".

While the foregoing description has been primarily directed toward the utilization of means for diagnosing and training "suppression" in a squinter, the device is further useful in treating other conditions. Amblyopia conditions, wherein the patient has poor visual acuity in one eye needing training can be treated, as well as conditions of anomalous correspondence. Thus, the use of check mark 56 in combinnation with the graduated brightness control is in general directed to the provision of means for initially establishing binocular vision by breaking down certain conditions of the eye accompanying heterotropia, such as the foregoing mentioned suppression, anomalous correspondence, or amblyopia.

From the foregoing it will be readily apparent that various changes and substitutions can be made without departing from the spirit and scope of the invention. Therefore, it is the intention to be limited only as in the following claims.

I claim:

1. An orthoptic exercising device to be worn by a person comprising a frame, attachment means for supporting the frame adapted to carry the device across the face of the wearer, masking means on the frame, first and second windows formed through the masking means and adapted to be disposed respectively in front of an associated one of the eyes of the wearer, means forming a viewing passage aligned with each of said windows, each passage being formed to define a restricted visual field for its associated eye so that the visual fields partially overlap commencing at a predetermined distance in front of the wearer, the overlap being such that at least some object targets lie common to each field and provide, as to one of said targets, a line of sight extending therefrom to one eye and another line of sight extending separately and independently therefrom to the other eye, means for selectively changing the direction of a single one of said lines of sight with respect to the other to displace, at one of said windows, an image of said one target to vary the fusional effort required of the wear to provide fusion of the respective monocular images of said one object target, and a check mark supported by the frame and movable between retracted and advanced positions into and out of said fields to selectively partially obstruct one or the other of said visual fields from a point within said distance.

2. An orthoptic exercising device to be worn by a person comprising a frame, attachment means for supporting the frame adapted to carry the device across the face of the wearer, masking means on the frame, first and second windows formed through the masking means and adapted to be disposed respectively in front of an associated one of the eyes of the wearer, means forming a viewing passage aligned with each of said windows, each passage being formed to define a restricted visual field for its associated eye so that the visual fields partially overlap commencing at a predetermined distance in front of the wearer, the overlap being such that at least some object targets lie common to each field and provide, as to one of said targets, a line of sight extending therefrom to one eye and another line of sight extending separately and independently therefrom to the other eye, means for selectively changing the direction of one of said lines of sight with respect to the other to displace, at one of said windows, an image of said one target to vary the fusional effort required of the wearer to provide fusion of the respective monocular images of said one object target, marker means supported by the frame and selectively movable to be positioned into one or the other of said fields to detect suspenopsia in either eye and check for continuous binocular viewing of said one object target by the wearer, and means for gradually rendering the monocular image of said one target less discernable to one eye to impose an anti-suppression stimulus upon the other eye.

3. In a wearable orthoptic exercising device, a frame, means for supporting the frame and adapted to carry the device across the face of the wearer, masking means on the frame, first and second windows formed through the masking means respectively adapted to be disposed in front of an associated one of the eyes of the wearer, means forming a viewing passage aligned with each of said windows, the last named means serving to form said passages whereby each passage defines a restricted visual field for its associated eye with the visual fields partially overlapping commencing at a predetermined distance in front of the wearer, said distance being such that at least some object targets lie common to each field and provide, as to one of said targets, a line of sight extending therefrom to one eye and another line of sight extending to the other eye, and means forming a movably supporting a check mark for movement between retracted and advanced positions to selectively enter one or the other of said visual fields to the substantial exclusion thereof from the other of said fields, and means for gradually rendering the monocular image of said one target less discernable to one eye than the other to impose an anti-suppression stimulus upon the other eye.

4. Orthoptic exercising apparatus according to claim 3 wherein the last named means includes first and second light polarizing lens carried by said frame disposed across the light path passing through one of said windows, and means for disposing one of said lenses with respect to the other to establish various degrees of crosspolarization of light passing through both said lenses so as to dim the monocular image associated therewith.

5. Wearable orthoptic exercising apparatus according to claim 16 wherein one of said windows is an elongated laterally extending opening and the other said window is adapted to be aligned directly in front of the pupil of one eye of the wearer whereby the elongated window serves to accommodate a range of substantially differing interpupillary distance free of adjustment of the spacing between said windows.

6. A wearable orthoptic device comprising a frame, means for supporting the frame adapted to carry the device across the face of the wearer, means defining first and second viewing windows adapted to be disposed respectively in front of an associated one of the eyes of the wearer, means forming a viewing passage aligned with each of said windows, each passage being formed to define a restricted visual field for its associated eye so that the visual fields partially overlap commencing at a predetermined distance in front of the wearer, the overlap being such that at least some object targets lie common to each field and provide, as to one of said targets, a line of sight extending therefrom respectively to each eye, a first mirror lying in a plane disposed at an angle to one of said lines and a second mirror substantially parallel to and spaced from said first mirror, said first mirror lying in position to direct an image of said one target to said second mirror and from said second mirror via one of said windows to the associated eye of the wearer, a mirror control member for tipping the plane of one of the mirrors with respect to the plane of the other, and means forming an indicating scale disposed on an outer surface of the device in position to cooperate with said control member, said scale including indicia representative of orthophoric positioning of said mirrors, said control member being selectively movable to change the direction of said one line with respect to the other to displace, at the last named window, an image of said one target so as to vary the fusional effort required of the wearer to provide fusion of the respective monocular images of said one object target.

7. An orthoptic device to be worn by a person comprising a frame, attachment means for supporting the frame and adapted to carry the device across the face of the wearer, masking means on the frame, first and second windows formed through the masking means and adapted to be disposed respectively in front of an associated one of the eyes of the wearer, means forming a viewing passage aligned with each of said windows, each passage being formed to define a restricted visual field for its associated eye so that the visual fields partially overlap commencing at a predetermined distance in front of the wearer, the overlap being such that at least some object targets lie common to each field and provide, as to one of said targets, a line of sight extending therefrom respectively to each eye, a first mirror lying in a plane disposed at substantially 45° to one of said lines and a second mirror substantially parallel to and spaced from said first mirror, said first mirror lying in position to direct an image of said one target to said second mirror and from said second mirror via one of said windows to the associated eye of the wearer, a mirror control member for tipping the plane of one of the mirrors with respect to the plane of the other, and an indicating scale disposed on an outer surface of the device in position to cooperate with said member, said scale including indicia representative of orthophoric positioning of said mirrors, said control member being selectively movable to change the direction of said one line with respect to the other to displace, at the last named window, an image of said one target to vary the fusional effort required of the wearer to provide fusion of the respective monocular images of said one object target, marker means supported by the frame and selectively movable to be positioned into one or the other of said fields to detect suspenopsia in either eye and check for continuous binocular viewing of said one object target by the wearer, and means for gradually rendering the monocular image of said one target less discernable to one eye to impose an anti-suppression stimulus upon the other eye.

8. An ocular viewing device to be worn by a patient under treatment comprising means including first and second viewing windows defining a line of sight for each eye of a patient, said lines of sight extending independently of each other to a single target to form a monocular image of the target for each eye, means for relatively obscuring one of the two monocular images of the target to tend to establish binocular vision relative to said target, mirror means for varying one line of sight with respect to the other while retaining said other line of sight free of deviation so as to vary the deviation of only one monocular image while retaining the other image free of deviation to develop fushion in the patient, a frame supporting all the aforesaid means, and means serving to readily releasable support said frame carried from spectacles worn by a patient.

9. An ocular viewing device to be worn by a patient under treatment comprising means including first and second viewing windows for respectively passing an associated one of two lines of sight defined to extend respectively therethrough from each eye independently of each other to a single target common to each line of sight, said first and second viewing windows being disposed at permanently fixed, spaced apart positions, the open viewing portion of one of said windows accommodating without adjustment a range of substantially differing interpupillary distances with respect to the other, means serving to vary the line of sight via one of said windows while retaining the other line of sight free of deviation to develop fushion in the patient, and a frame supporting all the aforesaid means and adapted to be worn by the patient.

10. An orthoptic exercising device to be worn by a person comprising a frame, attachment means for supporting the frame adapted to carry the device across the face of the wearer, masking means on the frame, first and second windows formed through the masking means and adapted to be disposed respectively in front of an associated one of the eyes of the wearer, means forming a viewing passage aligned with each of said windows, each passage being formed to define a restricted visual field for its associated eye so that the visual fields partially overlap commencing at a predetermined distance in front of the wearer, the overlap being such that at least some object targets lie common to each field and provide, as to one of said targets, a line of sight extending therefrom to one eye and another line of sight extending separately and independently therefrom to the other eye, means for selectively changing the direction of one of said lines of sight with respect to the other to displace, at one of said windows, an image of said one target to vary the fusional effort required of the warer to provide fusion of the respective monocular images of said one object target, marker means supported by the frame and selectively movable to be positioned into one or the other of said fields to detect suspenopsia in either eye and check for continuous binocular viewing of said one object target by the wearer, the last named means comprising a marker and means for positioning the marker comprising an elongated support arm, said support arm carrying said marker at one end thereof, means at the other end of the arm pivotally securing the arm to permit the marker to be moved across the face of the wearer, the length of said arm being such that said marker moves at distances not substantially greater than said predetermined distance to preclude simultaneous disposition of said marker in both said visual fields, and means for gradually rendering the monocular image of said one target less discernable to one eye to impose an anti-suppression stimulus upon the other eye.

11. An orthoptic exercising device to be worn by a person comprising a frame, attachment means for supporting the frame adapted to carry the device across the face of the wearer, masking means on the frame, first and second windows formed through the masking means and adapted to be disposed respectively in front of an associated one of the eyes of the wearer, means forming a viewing passage aligned with each of said windows, each passage being formed to define a restricted visual field for its associated eye so that the visual fields partially overlap commencing at a predetermined distance in front of the wearer, the overlap being such that at least some object targets lie common to each field and provide, as to one of said targets, a line of sight extending therefrom to one eye and another line of sight extending separately and independently therefrom to the other eye, means for selectively changing the direction of one of said lines of sight with respect to the other to displace, at one of said windows, an image of said one target to vary the fusional effort required of the wearer to provide fusion of the respective monocular images of said one object target, marker means supported by the frame and selectively movable to be positioned into one or the other of said fields to detect suspenopsia in either eye and check for continuous binocular viewing of said one object target by the wearer, the last named means including an elongated pivot arm supporting said check mark, said pivot arm extending sufficiently to carry said check mark to move across each of said fields but to stay substantially within said distance to preclude simultaneous observance of the check mark by both eyes, and means for gradually rendering the monocular image of said one target less discernable to one eye to impose an anti-suppression stimulus upon the other eye.

References Cited

UNITED STATES PATENTS

| | | | |
|---|---|---|---|
| 2,057,066 | 10/1936 | Smith | 128—76 |
| 2,388,858 | 11/1945 | MacNeille et al. | 88—20 |
| 2,837,086 | 6/1958 | Thorburn | 128—76 |
| 2,817,332 | 12/1957 | Shlechter | 128—76 |

L. W. TRAPP, Primary Examiner

U.S. Cl. X.R.

128—2